US012744309B2

(12) United States Patent
Cerretelli et al.

(10) Patent No.: US 12,744,309 B2
(45) Date of Patent: Sep. 22, 2026

(54) ANTENNA FOR MOTOR VEHICLES, AND MOTOR VEHICLE COMPRISING SUCH AN ANTENNA

(71) Applicant: ASK Industries S.p.A., Monte San Vito (IT)

(72) Inventors: Matteo Cerretelli, Sesto Fiorentino (IT); Stefano Lenzini, Modena (IT); Fabio Casoli, Reggio Emilia (IT); Andrea Notari, Scandiano (IT); Stefano Scorcioni, Serramazzoni (IT)

(73) Assignee: ASK Industries S.p.A., Monte San Vito (IT)

( * ) Notice: Subject to any disclaimer, the term of this patent is extended or adjusted under 35 U.S.C. 154(b) by 18 days.

(21) Appl. No.: 19/020,063

(22) Filed: Jan. 14, 2025

(65) Prior Publication Data

US 2025/0239785 A1 Jul. 24, 2025

(30) Foreign Application Priority Data

Jan. 18, 2024 (IT) ........................ 102024000000900

(51) Int. Cl.
*H01Q 1/32* (2006.01)
*H01Q 1/12* (2006.01)
*H01Q 1/36* (2006.01)
*H01Q 21/30* (2006.01)

(52) U.S. Cl.
CPC ......... *H01Q 1/3275* (2013.01); *H01Q 1/1214* (2013.01); *H01Q 1/362* (2013.01); *H01Q 21/30* (2013.01)

(58) Field of Classification Search
CPC .... H01Q 1/1214; H01Q 1/3275; H01Q 1/362; H01Q 21/30
See application file for complete search history.

(56) References Cited

U.S. PATENT DOCUMENTS

2016/0064807 A1* 3/2016 Reed ...................... H01Q 21/28 343/749

FOREIGN PATENT DOCUMENTS

KR 101421923 B1 * 7/2014 ............. H01Q 21/28

OTHER PUBLICATIONS

1 Search Report from Corresponding Italian Patent Application No. 102024000000900, dated Jul. 17, 2024.

* cited by examiner

*Primary Examiner* — Amal Patel
(74) *Attorney, Agent, or Firm* — Cooper Legal Group LLC

(57) ABSTRACT

An antenna for a motor vehicle having a mounting base for connection to a mounting surface of the motor vehicle. An electronic circuit is arranged on the mounting base. A first radiating element receives first signals emitted in a first frequency band by external devices and transmits the first signals towards the electronic circuit. A second radiating element receives second signals emitted in a second frequency band different from the first frequency band by external devices and transmits the second signals towards the electronic circuit. The second radiating element includes a first printed circuit board extending upwardly from the electronic circuit. An electrically conductive track is disposed on the first printed circuit board and travels along a helical or serpentine path, up to a predetermined height. The electronic circuit is configured to distinctly process the first and second signals received from the first and second radiating elements, respectively.

8 Claims, 3 Drawing Sheets

ANTENNA FOR MOTOR VEHICLES, AND MOTOR VEHICLE COMPRISING SUCH AN ANTENNA

CROSS-REFERENCE TO RELATED APPLICATION(S)

This application claims priority under 35 U.S.C. § 119 to: Italian Patent Application No.: 102024000000900, filed on 18 Jan. 2024, which is herein incorporated by reference.

BACKGROUND

The present disclosure relates to an antenna for motor vehicles, and to a motor vehicle comprising such an antenna.

The antenna according to the disclosure is especially suited for use in automobiles, for example mounted on the roof of a car, and will be described herein with reference to such use without limiting its possible applications to other types of motor vehicles, such as buses, trucks, commercial vehicles, et cetera.

As is well known, antennas intended to be mounted on the roof or another external surface of a motor vehicle essentially comprise a functional part, consisting of a plurality of suitably configured and assembled components that are suitable for mounting and operating the antenna, and a cover or dome whose purpose is to contain the various functional components of the antenna and to ensure, where possible, that the vehicle retains a suitable aerodynamic appearance and efficiency once the antenna has been installed.

Normally, the functional part of the antennas used comprises a plurality of radiating elements that can transceive data and signals of different types according to various standards and related frequency ranges that have been introduced over the years.

Although the antennas currently on the market can perform the functions for which they are designed, there are some aspects that could be improved.

In particular, the presence of several radiating elements inevitably placed close together in the cramped space offered by the cover, leads to problems concerning the actual quality of the signals due to the possible coupling between the signals afferent to two or more radiating elements and interfering with each other.

Therefore, there is desire and room for improvements in existing antennas.

SUMMARY

The present disclosure provides an antenna for a motor vehicle, comprising at least:

- a mounting base configured to be connected to a mounting surface of said motor vehicle;
- an electronic circuit suitable for being arranged on said mounting base;
- a first non-resonant radiating element which is operatively connected to said electronic circuit and is configured to receive and transmit toward said electronic circuit, first signals emitted in a first frequency band by one or more devices external to the antenna;
- a second radiating element which is configured to receive and transmit toward said electronic circuit, second signals emitted in a second frequency band different from said first frequency band by one or more devices external to the antenna, said second radiating element comprising a first printed circuit board which is arranged with a first end portion thereof on said electronic circuit and rises upwardly therefrom, along said first printed-circuit board being arranged an electrically conductive track which has one end connected to said electronic circuit and develops on said first printed circuit board along a substantially helical or serpentine path, up to a predetermined height;
- and in which said electronic circuit is configured at least to process distinctly with each other said first and second signals received from said first non-resonant radiating element and said second radiating element.

According to some embodiments, the antenna according to the present disclosure may comprise one or more of the following features, which may be combined in any technical feasible combination:

- the first non-resonant radiating element is made of a single piece of metallic material;
- the first non-resonant radiating element comprises a shaped body having at least a first portion having a substantially planar development which is connected at a first end thereof to said electronic circuit and rises upwardly therefrom;
- with reference to a side view, the mounting base has a front edge and a rear edge, and wherein the first non-resonant radiating element is arranged with said at least one first portion having a substantially planar development substantially aligned with the second radiating element along a direction joining said front and rear edges;
- the shaped body of the first non-resonant radiating element further comprises a second portion which, when viewed frontally, comprises a first portion extending transversely from a second end of said first portion opposite said first end, a first arm which raises from said first portion away from the mounting base, a second portion extending transversely from said first arm, and a second arm which extends from said second portion toward the mounting base, said first and second arms extending from said second portion from opposite sides of said first portion diverging from each other;
- the first non-resonant radiating element is configured to receive and transmit to said electronic circuit first signals emitted in the frequency band Frequency Modulation, FM, and said second radiating element is configured to receive and transmit to said electronic circuit second signals emitted in the frequency band Digital Audio Broadcasting;
- the electronic circuit comprises or is constituted by a printed circuit board placed on said mounting base;
- the electronic circuit comprises a first filter stage and a second filter stage, and an active stage interposed between said first and second filter stages, wherein the first filter stage comprises at least:
  - (a) a first filter configured to extract said first signals emitted in said first frequency band and let through toward and substantially adapt them with the input impedance of said active stage; and
  - (b) a second filter configured to extract said second signals emitted in said second frequency band and let through toward and substantially adapt them with the input impedance of said active stage;
- and wherein the active stage comprises at least a first active stage and a second active stage operatively associated with said first filter, and a third active stage and a fourth active stage operatively associated with said second filter; and wherein, said second filter stage comprises at least:

(c) a third filter that is operatively connected to said first and second active stages and is configured to let through said first signals by eliminating noise or unwanted harmonics that may be present in said first signals to be let through;

(d) a fourth filter that is operatively connected to said third and fourth active stages and is configured to let through said second signals by eliminating noise or unwanted harmonics possibly present in said second signals to be let through;

the electronic circuit further comprises a combiner which conveys on a common coaxial cable the first and second signals output from said third filter and fourth filter, respectively.

The present disclosure provides also a motor vehicle comprising at least one antenna as above defined.

Further features and advantages of the disclosure will appear from the following detailed description, carried out by way of non-limiting example only, with reference to the accompanying drawings, in which

DETAILED DESCRIPTION

It should be noted that in the following detailed description, identical or similar components, from a structural and/or functional point of view, may have the same or different reference numbers, regardless of whether they are shown in different embodiments of the present disclosure or in separate parts.

It should also be noted that, in order to clearly and concisely describe the present disclosure, the drawings may not be to scale and some features of the description may be shown in a somewhat schematic form.

Furthermore, when the term "adapted" or "configured" or "shaped" or a similar term is used herein, referring to any component as a whole, or to any part of a component or a combination of components, it shall be understood to mean and include correspondingly the structure and/or configuration and/or shape and/or positioning.

In particular, when these terms refer to electronic hardware or software, they are to be understood as including electronic circuits or parts of electronic circuits, as well as software/firmware, such as algorithms, routines and programs in general, running and/or resident in any storage medium.

In addition, when the term "substantial" or "substantially" is used herein, it shall be construed as including unavoidable constructional/functional tolerances. In addition, when the term "substantial" or "substantially" is used herein, it shall be construed as including unavoidable mechanical/performance tolerances, or an actual variation of plus or minus 5% from the stated reference value, direction or position, and when the terms "transverse" or "transversely" are used herein, they are to be understood as including a direction not parallel to the reference part(s)/axis(s) to which they refer, and perpendicularity is to be regarded as a specific case of transverse direction.

Finally, in the following description and claims, the ordinal numerals first, second, et cetera, will be used for reasons of illustrative clarity and in no way should they be understood as limiting for any reason whatsoever, nor that the order should be exactly that in the sequence described with reference to the exemplary embodiments described.

Figure 1:
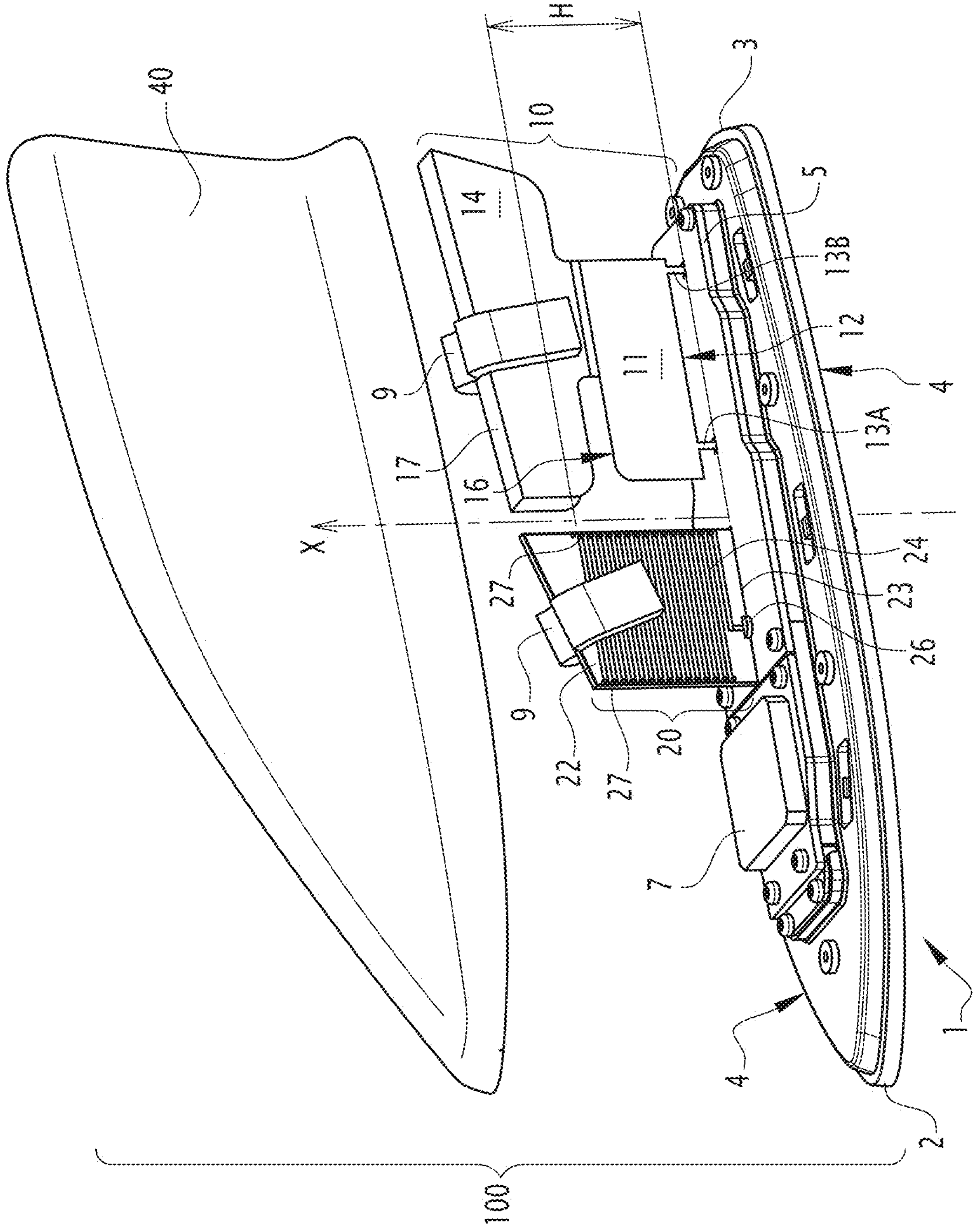
FIG. 1 is an exploded view illustrating a possible embodiment of the antenna according to the disclosure.
Figure 2:
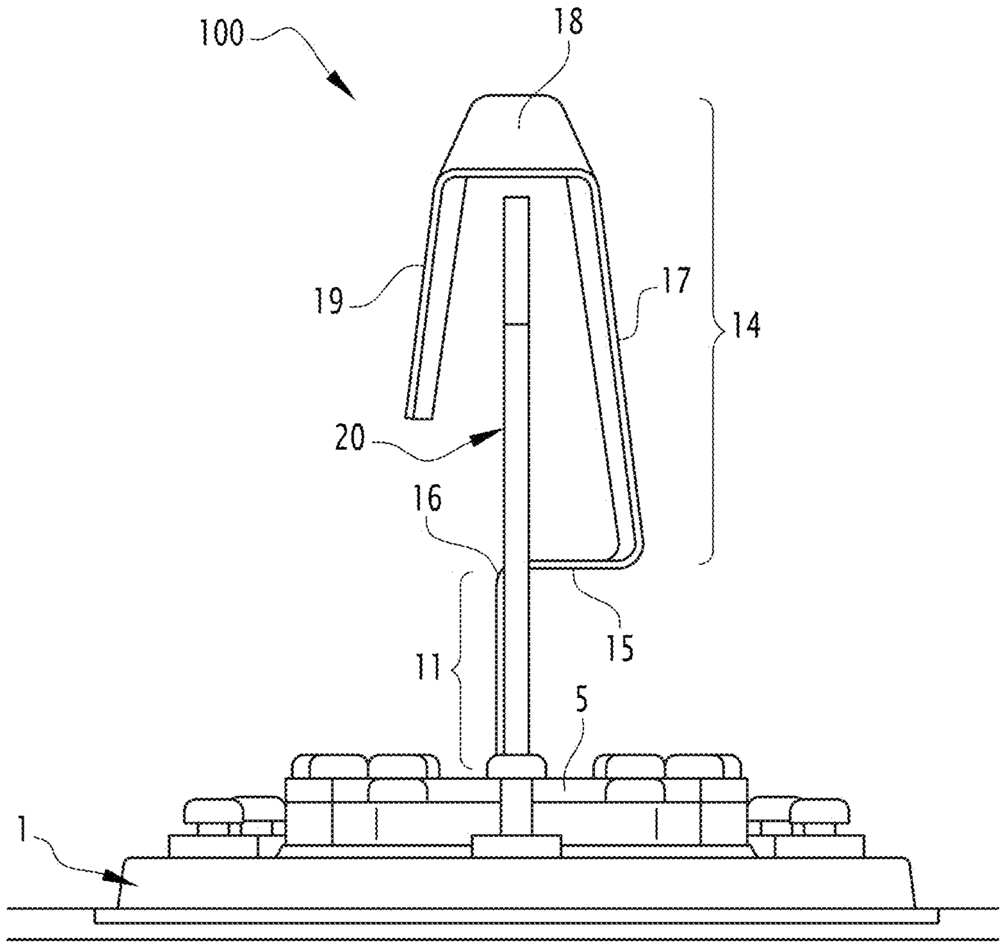
FIG. 2 is a front view of the antenna in FIG. 1.
Figure 3:
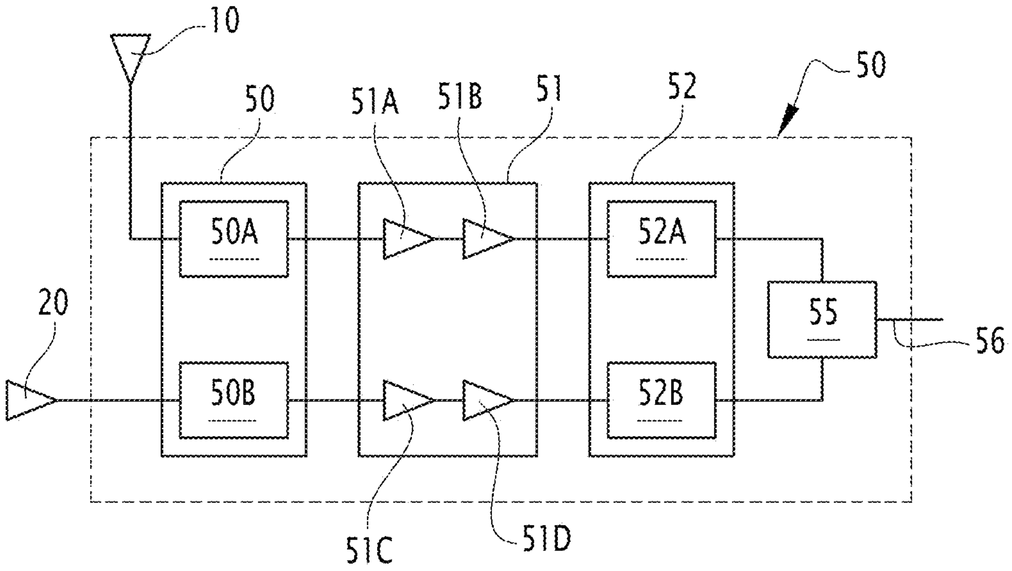
FIG. 3 is a block diagram schematically illustrating an electronic circuit used in the antenna according to the disclosure.

FIGS. 1 to 3 illustrate a possible embodiment of an antenna according to the disclosure, indicated globally by the reference number 100.

The antenna 100 according to the disclosure comprises at least:

a mounting base 1 which, when the antenna 100 is installed, is intended to be coupled to a mounting surface of a motor vehicle, e.g. on its roof;

an electronic circuit 5 suitable for being arranged on the mounting base 1, either directly or with one or more other components interposed between them;

at least one non-resonant radiating element, indicated by the reference numeral 10, which is operatively connected to the electronic circuit 5 and is configured to receive and transmit towards said electronic circuit 5, first signals emitted, from one or more devices external to the antenna 100, in a first frequency band;

a second radiating element 20 which is configured to receive and transmit towards said electronic circuit 5, second signals emitted, from one or more devices external to the antenna 100, in a second frequency band different from the first frequency band.

For example, the second frequency band is higher than the first frequency band.

The non-resonant radiating element 10 has a high reactive component.

In particular, as known to those skilled in the art, a resonant radiating element is a radiating element whose input impedance has a reactive component that crosses zero at the center of the relevant transceiver frequency band, while a non-resonant one is a radiating element whose input impedance has a reactive component that is not zero and has a modulus substantially greater than the resistive component, e.g. about 5-6 times greater.

In particular, the second radiating element 20 comprises a first printed circuit board 22 which is arranged with one of its first end portions 23, i.e. at one of its lower ends, on the electronic circuit 5 and rises upwardly from it along a reference direction transversal to the electronic circuit 5, indicated in FIG. 1 by the arrow X.

For example, the reference direction X is a direction lying in a virtual plane transversal, and in particular perpendicular, to the electronic circuit 5.

For instance, when the electronic circuit 5 is arranged on the mounting base 1, e.g. in a substantially horizontal position, the reference direction or axis X extends along a substantially vertical direction.

An electrically conductive track 24 is arranged along the first printed circuit board 22.

The electrically conductive track 24 has one end 26 connected to the electronic circuit board 5 and runs on the first printed circuit board 22 along a substantially helical or serpentine path, up to a predetermined height H.

A series of appropriately metallised through holes, indicated in FIG. 1 by the reference number 27, electrically connect the various conductor strip sections arranged on the two opposite sides of the first printed circuit board 22.

In this way, the metallised holes 27 and the various strip sections together form the electrically conductive trace 24 that runs continuously along the helical or serpentine path, up to the height H.

In practice, as a whole, the conductive track 24 essentially behaves as if it were a conducting loop wrapped around the first printed circuit board 22.

The height H, measured e.g. from the surface of the first end portion 23 resting on the electronic circuit 5, is chosen so as to optimise the transceiving of the signals emitted in the second frequency band.

Usefully, the electronic circuit 5 is at least configured to distinctly process said first and second signals received from the first non-resonant radiating element 10 and the second radiating element 20, respectively.

In one possible embodiment, the electronic circuit 5 comprises or consists of at least one printed circuit board (hereinafter "second printed circuit board") arranged on said mounting base 1, e.g. in a substantially horizontal position.

The mounting base 1 can be made in one or more pieces and in one or more materials suitably combined with each other.

For example, in the embodiment illustrated in FIGS. 1-2, the mounting base 1 has a central part made of metal on which the electronic circuit 5 is placed and the remaining part made of plastic material, and has, for example, a front edge 2, a rear edge 3 and two side edges 4 extending from the rear edge 3 converging towards each other to form the front edge 2, for example with a pointed shape.

In practice, in this exemplary embodiment, the mounting base 1 has a shape, seen in plan view from above or below, configured like the base of an iron.

In one possible embodiment the body of the mounting base 1 has, for example in a substantially central area, i.e. the area in which the second printed circuit board forming or being part of the electronic circuit 5 is positioned, a compartment or housing space in which cables, various electronic components, etc. can be accommodated.

As illustrated in FIG. 1, the antenna 100 also includes a cover 40 which is formed by an internally hollow shaped body, e.g. in the shape of a shark fin, made of plastic material.

During assembly, the cover 40 is mechanically coupled to the mounting base 1 so that at least the second printed circuit board forming or being part of the electronic circuit 5, as well as the two radiating elements 10 and 20, are housed in its cavity.

Clearly, depending on the applications, other components can be accommodated within the space offered by the cavity of the cover 40, e.g. gaskets, other signal-transmitting elements, etc.; for example, an additional component 7 configured for the reception of GPS signals is illustrated in FIG. 1.

The mounting of the mounting base 1 on the roof or on a suitable mounting surface of a motor vehicle and the connection of the cover 40 to the same mounting base 1, are carried out in a manner known or readily available to a person skilled in the art, and in any event not relevant to the present disclosure, and therefore not described in detail herein.

According to a possible embodiment, the first non-resonant radiating element 10 is configured to receive and transmit towards the electronic circuit 5 analogue type signals, in particular first signals emitted in the FM (Frequency Modulation) frequency band, and the second radiating element 20 is configured to receive and transmit towards the electronic circuit 5 digital type second signals, in particular signals emitted in the DAB frequency band.

In the example illustrated, the second frequency band, e.g. the DAB frequency band, is the upper frequency band with respect to the lower first frequency band, e.g. the frequency band FM.

Conveniently, in one possible embodiment, the first non-resonant radiating element 10 is made of a single piece of metal material, e.g. tin-plated steel.

In particular, the first non-resonant radiating element 10 has an overall electrical length that is less than the operating wavelength for each frequency band, and particularly the band with the higher operating frequency (thus having shorter wavelength).

In particular, the first non-resonant radiating element 10 has an overall electrical length equal to or less than 10% of the wavelength at the center of the upper frequency band between the first and second frequency bands, preferably equal to or less than 5%, more preferably equal to or less than 3%.

This may contribute or render the radiating element 10 non-resonant.

As known, the electrical length of an element may be defined as its physical length in relation to the working wavelength.

If the first non-resonant radiating element 10 is formed by one section substantially straight section, then the electrical length has to be calculated based on the length of that section, measured along the centerline thereof.

If the first non-resonant radiating element 10 is formed by two or more sections, the electrical length has to be calculated by summing all lengths calculated along the centerline of each section.

For instance, in case of a curved section, the respective length can be calculated and summed up to the other sections once the curved section is considered straightened.

In the exemplary embodiment illustrated, the first non-resonant radiating element 10 comprises a shaped body which is configured to fill as much as possible the space dedicated to it and comprised between the cover 40, the printed circuit board forming or included in the electronic circuit 5, and the second radiating element 20.

According to a possible embodiment, illustrated in the example of FIGS. 1 and 2, the shaped body of the first non-resonant radiating element 10 comprises at least a first portion or lower portion 11 having a substantially planar development, which is connected at a first end thereof 12, i.e. at a lower end thereof, to the electronic circuit 5 and rises transversely therefrom, e.g. along the reference direction or axis X, in particular a direction substantially perpendicular to the second printed circuit board forming or being part of the electronic circuit 5.

For example, the connection between the first non-resonant radiating element 10 and the electronic circuit 5 is made by means of one or more pins, e.g. two pins 13A and 13B as illustrated in FIG. 1, which are arranged at the lower end 12 of the first portion 11 and are suitable to be inserted and soldered therein into corresponding slots arranged on the second circuit board of the electronic circuit 5.

In a possible embodiment, with reference to a side view, the first non-resonant radiating element 10 is arranged with at least the first substantially planar portion 11 substantially aligned and in sequence with the second radiating element 20 along a direction joining the front edge 2 with the rear edge 3 of the mounting base 1.

In a possible embodiment, as illustrated in the example of FIGS. 1 and 2, the moulded body of the first non-resonant radiating element 10 additionally comprises a second, or upper portion 14, which is configured to realize a capacitive cap.

The capacitive cap 14 cooperates with the first portion 11 with planar development and allows the overall emissive capacity of the first non-resonant radiating element 10 to be optimised.

In particular, according to a possible embodiment, the second portion 14 comprises, with reference to a front view of the antenna 100 (i.e. view from the front edge 2 of the mounting base 1):

- a first section 15 extending transversally from a second end 16 of the first portion 11 opposite the first end 12;
- a first arm 17 which rises from the first section 15 and is directed away from the mounting base 1;
- a second section 18 which extends transversally from the first arm 17; and
- a second arm 19 which extends from the second section 18 towards the mounting base 1, said first and second arms 17, 19 extending from the second section 18 from opposite sides of the first portion 11 diverging from each other.

The second section 18, with reference to a side view of antenna 100, is inclined downwards proceeding from the rear edge 3 to the front edge 2 of mounting base 1.

According to this embodiment, the overall electrical length of the non-radiating element 10 is given by the sum of the electrical lengths of the sections 11, 15, 17, 18 and 19, for instance calculated along the center line of each section in a plane transversal to the plane where the electronic circuit 5 lies.

Such transversal plane can be for example a substantially vertical plane, e.g. the plane of the sheet of FIG. 2.

At least one protective element 9 can be placed around the second portion 14 of the first radiating element, e.g. a sponge or a piece of self-adhesive foam.

Such a protective element 9 can also be arranged directly around the first circuit board 22 of the second radiating element 20.

In a possible embodiment, the electronic circuit 5 comprises a first filter stage, indicated in FIG. 3 by reference number 50, a second filter stage, indicated in FIG. 3 by reference number 52, and an active stage, indicated in FIG. 3 by reference number 51, which is interposed between said first and second filter stages 50 and 52.

In particular, according to a possible embodiment, the first filtering stage 50 comprises at least:

- a first filter 50A that is configured to receive and filter out, e.g. by eliminating unwanted noise, said first signals emitted in the first frequency band and pass them towards and substantially adapt them to the input impedance of the active stage 51; and
- a second filter 50B which is configured to receive and filter out, e.g. by eliminating unwanted noise, said second signals emitted in the second frequency band and pass them towards and substantially adapt them to the impedance of the active stage 51.

In practice, the two filters 50A and 50B are selective filters of the frequency bands of interest, e.g. FM or DAB, and are adaptive in that they are configured to compensate for the reactive part of the non-resonant radiating element 10 in the band of interest (FM/DAB) by adapting it as much as possible to the complex conjugate of the input impedance of the active stage 51.

The complex conjugate is an input impedance value that has a resistive part substantially equal to the resistive part of the first non-resonant radiating element 10, and a reactive part that is of equal modulus but opposite sign to the reactive part of the first non-resonant radiating element 10.

Furthermore, these filters can also raise the remaining purely resistive value of the antenna impedance to better match the input value of the active stage 51, and are purely reactive, i.e. they do not introduce losses and optimise the performance of the stages from a noise point of view.

In one possible embodiment, the active stage 51 comprises at least a first plurality of active stages operatively connected to the first filter 50A and arranged in sequence with each other, and a second plurality of active stages connected to the second filter 50B and arranged in sequence with each other.

In particular, in the exemplary embodiment illustrated in FIG. 3, the active stage 51 comprises a first active stage 51A and a second active stage 51B which are operatively associated with the first filter 50A, and a third active stage 51C and a fourth active stage 51D operatively associated with the second filter 50B.

The active stages of the first plurality are configured to have high input impedance, in particular to better match the impedance of the non-resonant radiating element 10.

In particular, at least the first stage of the first and second plurality of active stages is optimised with regard to noise performance, while the following stage(s) of the first and second plurality of active stages is/are configured at least to optimise the dynamics performance so as to achieve an adequate compromise between the two requirements.

Clearly, the number of stages of the first and second plurality of active stages can be varied appropriately.

In a possible embodiment, the second stage of filtering 52 comprises at least:

- a third filter 52A which is operatively connected to said first and second active stages 51A, 51B and is configured to allow said first signals to pass through while eliminating noise or undesired harmonics that may be present in said first signals to be let through;
- a fourth filter 52B which is operatively connected to said third and fourth active stages 51C and 51D, and is configured to allow said second signals to pass through while eliminating unwanted noise or harmonics that may be present in said second signals to be allowed to pass.

In practice, the third 52A filter and the fourth 52B filter are additional selective filters so that the respective signals are only allowed to pass in the band of interest (FM/DAB).

This makes it possible to reduce out-of-band noise and unwanted harmonics, e.g. upper harmonics or IM2 second-order intermodulation.

In a possible embodiment, the electronic circuit 5 further comprises a combiner, schematically represented in FIG. 3 by reference number 55, which is configured to convey on a common coaxial cable, schematically represented in FIG. 3 by reference number 56, the first and second output signals from said third filter 52A and fourth filter 52B, respectively.

In this way, the combiner 55 allows the unification of signals (each in its own frequency band) on a single coaxial output cable 56, optimising overall implementation costs.

Alternatively, signals for the first and second frequency bands can be routed along two separate cables without using the combiner 55.

In practice, it has been ascertained that the antenna 100 according to the disclosure adequately fulfils its intended purpose, as it has a structure which, compared to known solutions, allows the signals afferent to the two radiating elements 10 and 20 to be decoupled more effectively, making optimal use of the albeit limited space available within the cover 40.

In addition, the antenna 100 features a design that makes it suitable for use in new motor vehicles as well as for replacing antennas already installed on motor vehicles in use.

Of course, without prejudice to the principle of the disclosure, the forms of implementation and details of realisation may be widely varied with respect to what has been described and illustrated purely by way of non-limiting example, without thereby departing from the scope of protection of the present disclosure as defined by the appended claims, including any possible combination, even partial, of the embodiments described above.

For example, the non-resonant radiating element 10 can also receive signals in the AM frequency band. In this case, the AM signals can be processed by the electronic circuit 50 in parallel to the signals in the other frequency bands described above, e.g. by using low-pass filtering at the input and then amplifying the signals in parallel to the others, and then feeding the AM signals also into the combiner 55.

The invention claimed is:

1. An antenna for a motor vehicle, comprising at least:

a mounting base configured to be connected to a mounting surface of said motor vehicle;

an electronic circuit suitable for being arranged on said mounting base;

a first non-resonant radiating element which is operatively connected to said electronic circuit and is configured to receive and transmit toward said electronic circuit, first signals emitted in a first frequency band by one or more devices external to the antenna;

a second radiating element which is configured to receive and transmit toward said electronic circuit, second signals emitted in a second frequency band different from said first frequency band by one or more devices external to the antenna, said second radiating element comprising a first printed circuit board, wherein said first printed circuit board has a first end portion arranged on said electronic circuit and rises upwardly therefrom, wherein an electrically conductive track is arranged along said first printed-circuit board, wherein said electrically conductive track has one end connected to said electronic circuit and develops on said first printed circuit board along a substantially helical or serpentine path, up to a predetermined height; and wherein said electronic circuit is configured at least to process distinctly with each other said first and second signals received from said first non-resonant radiating element and said second radiating element; and wherein said first non-resonant radiating element comprises a shaped body that has at least a first portion having a substantially planar development which is connected at a first end thereof to said electronic circuit and rises upwardly therefrom, and a second portion which, when viewed frontally, comprises a first part extending transversely from a second end of said first portion opposite said first end, a first arm which raises from said first part away from the mounting base, a second part extending transversely from said first arm, and a second arm which extends from said second part toward the mounting base, said first and second arms extending from said second part from opposite sides of said first portion diverging from each other.

2. The antenna according to claim 1, wherein said first non-resonant radiating element is made of a single piece of metallic material.

3. The antenna according to claim 1, wherein, with reference to a side view, said mounting base has a front edge and a rear edge, and wherein said first non-resonant radiating element is arranged with said at least a first portion having a substantially planar development substantially aligned with said second radiating element along a direction joining said front and rear edges.

4. The antenna according to claim 1, wherein said first non-resonant radiating element is configured to receive and transmit to said electronic circuit first signals emitted in the frequency band Frequency Modulation, FM, and said second radiating element is configured to receive and transmit to said electronic circuit second signals emitted in the frequency band Digital Audio Broadcasting, DAB.

5. The antenna according to claim 1, wherein said electronic circuit comprises a printed circuit board disposed on said mounting base.

6. The antenna according to claim 1, wherein said electronic circuit comprises a first filter stage and a second filter stage, and an active stage interposed between said first and second filter stages;

wherein said first filter stage comprises at least:

a first filter configured to extract said first signals emitted in said first frequency band and let through toward and substantially adapt them with the input impedance of said active stage; and a second filter configured to extract said second signals emitted in said second frequency band and let through toward and substantially adapt them with the input impedance of said active stage;

wherein said active stage comprises at least a first active stage and a second active stage operatively associated with said first filter, and a third active stage and a fourth active stage operatively associated with said second filter; and wherein, said second filter stage comprises at least:

a third filter that is operatively connected to said first and second active stages and is configured to let through said first signals by eliminating noise or unwanted harmonics that may be present in said first signals to be let through;

a fourth filter that is operatively connected to said third and fourth active stages and is configured to let through said second signals by eliminating noise or unwanted harmonics possibly present in said second signals to be let through.

7. The antenna according to claim 6, wherein said electronic circuit further comprises a combiner which conveys on a common coaxial cable the first and second signals output from said third filter and fourth filter, respectively.

8. A motor vehicle comprising at least one antenna according to claim 1.

* * * * *